(12) United States Patent
Miki

(10) Patent No.: US 8,317,000 B2
(45) Date of Patent: Nov. 27, 2012

(54) WHEEL STOP MADE OF METAL PIPE AND CAPABLE OF TRANSMITTING POWER TO ELECTRIC CAR WHILE BEING PARKED

(75) Inventor: Sadao Miki, Fukuoka (JP)

(73) Assignee: MEC Co., Ltd., Fukuoka (JP)

( * ) Notice: Subject to any disclaimer, the term of this patent is extended or adjusted under 35 U.S.C. 154(b) by 174 days.

(21) Appl. No.: 12/960,101

(22) Filed: Dec. 3, 2010

(65) Prior Publication Data

US 2011/0067960 A1    Mar. 24, 2011

Related U.S. Application Data

(63) Continuation-in-part of application No. PCT/JP2009/002017, filed on May 8, 2009.

(30) Foreign Application Priority Data

Jun. 4, 2008    (JP) ................. 2008-146503

(51) Int. Cl.
*B61H 13/00* (2006.01)
(52) U.S. Cl. .......................................... 188/36
(58) Field of Classification Search ............... 188/5, 36, 188/32, 1.12; 320/102, 111; D25/102; D10/10; 404/565, 6; 362/152
See application file for complete search history.

(56) References Cited

U.S. PATENT DOCUMENTS 3,750,331 A * 8/1973 Renaux .............................. 49/35
4,875,797 A 10/1989 Hartwig

FOREIGN PATENT DOCUMENTS

| EP | 0849400 A1 | 6/1998 |
|----|------------|--------|
| FR | 2289678 | 5/1976 |
| JP | 53-69134 | 6/1978 |
| JP | 58-90206 | 6/1983 |
| JP | 2-116517 | 9/1990 |
| JP | 3-83211 | 8/1991 |
| JP | 4-28893 Y2 | 7/1992 |
| JP | 04-371678 | 12/1992 |
| JP | 06-231361 | 8/1994 |
| JP | 06-346618 | 12/1994 |
| JP | 2001-088667 | 4/2001 |

(Continued)

OTHER PUBLICATIONS

International Search Report issued in PCT Application No. PCT/JP2009/002017 dated Jul. 7, 2009, 2 pages.
International Preliminary Report on Patentability and Written Opinion of the International Searching Authority issued in PCT Application No. PCT/JP2009/002017 dated Jan. 11, 2011, 5 pages.

(Continued)

*Primary Examiner* — Melanie Torres Williams
(74) *Attorney, Agent, or Firm* — Dorsey & Whitney

(57) ABSTRACT

A wheel stop is disclosed which is engaged by a wheel of a vehicle in an attempt to be parked in a parking lot, to limit movement of the vehicle. The wheel stop includes a middle extending portion, first and second leg portions, all of which are integrally formed with a metal pipe. The wheel stop further includes first and second anchor plates affixed to the first and second leg portions, respectively, the anchor plates being anchored to the parking lot; an electric cable disposed within the metal pipe; and an electric outlet disposed on an outer surface of the metal pipe, and connected with the electric cable, to thereby allow, when the vehicle parked in the parking lot is an electric car, a power supply cable extending from the electric car to be plugged into the electric outlet.

1 Claim, 8 Drawing Sheets

FOREIGN PATENT DOCUMENTS

| | | |
|---|---|---|
| JP | 2002-021366 | 1/2002 |
| JP | 2002-70355 | 3/2002 |
| JP | 2003-061266 | 2/2003 |
| JP | 2003-074025 | 3/2003 |
| JP | 2005-163455 | 6/2005 |
| JP | 42-80807 | 6/2009 |

OTHER PUBLICATIONS

First Office Action issued in Japanese Application No. 2008-146503 dated Sep. 9, 2008, 9 pages.
Second Office Action issued in Japanese Application No. 2008-146503 dated Dec. 25, 2008, 9 pages.

\* cited by examiner

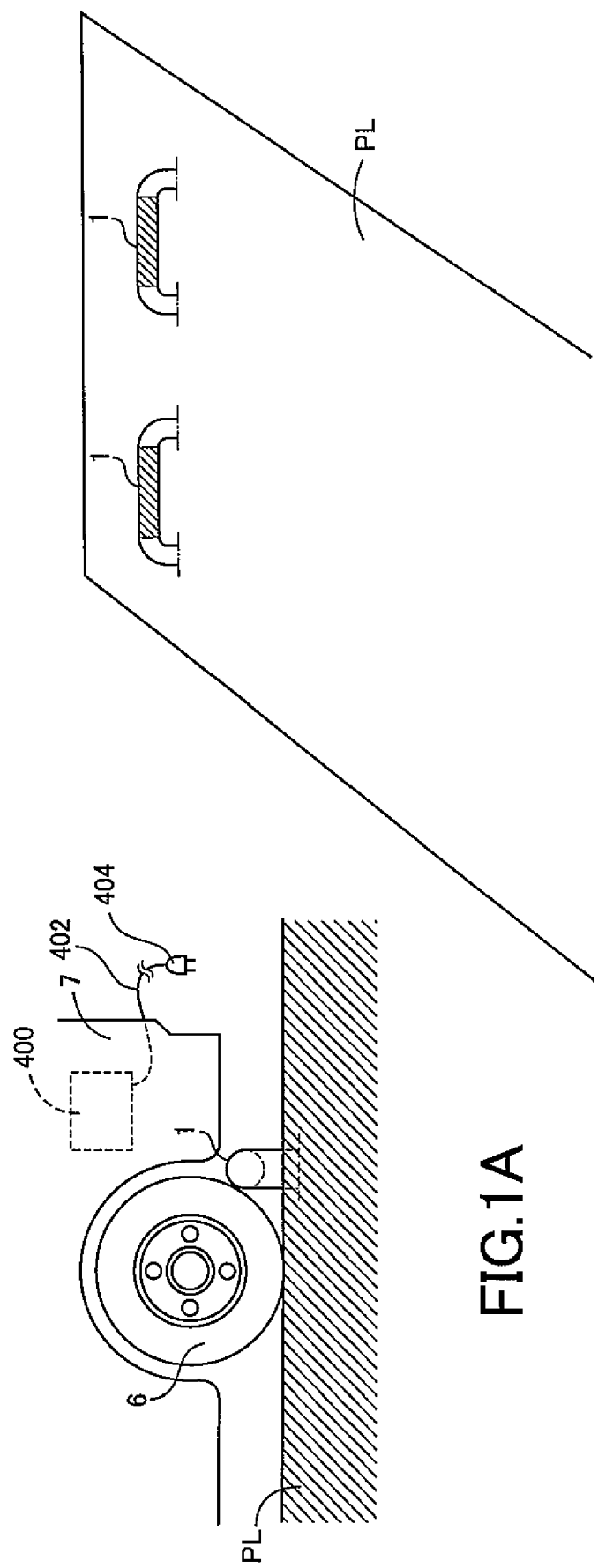

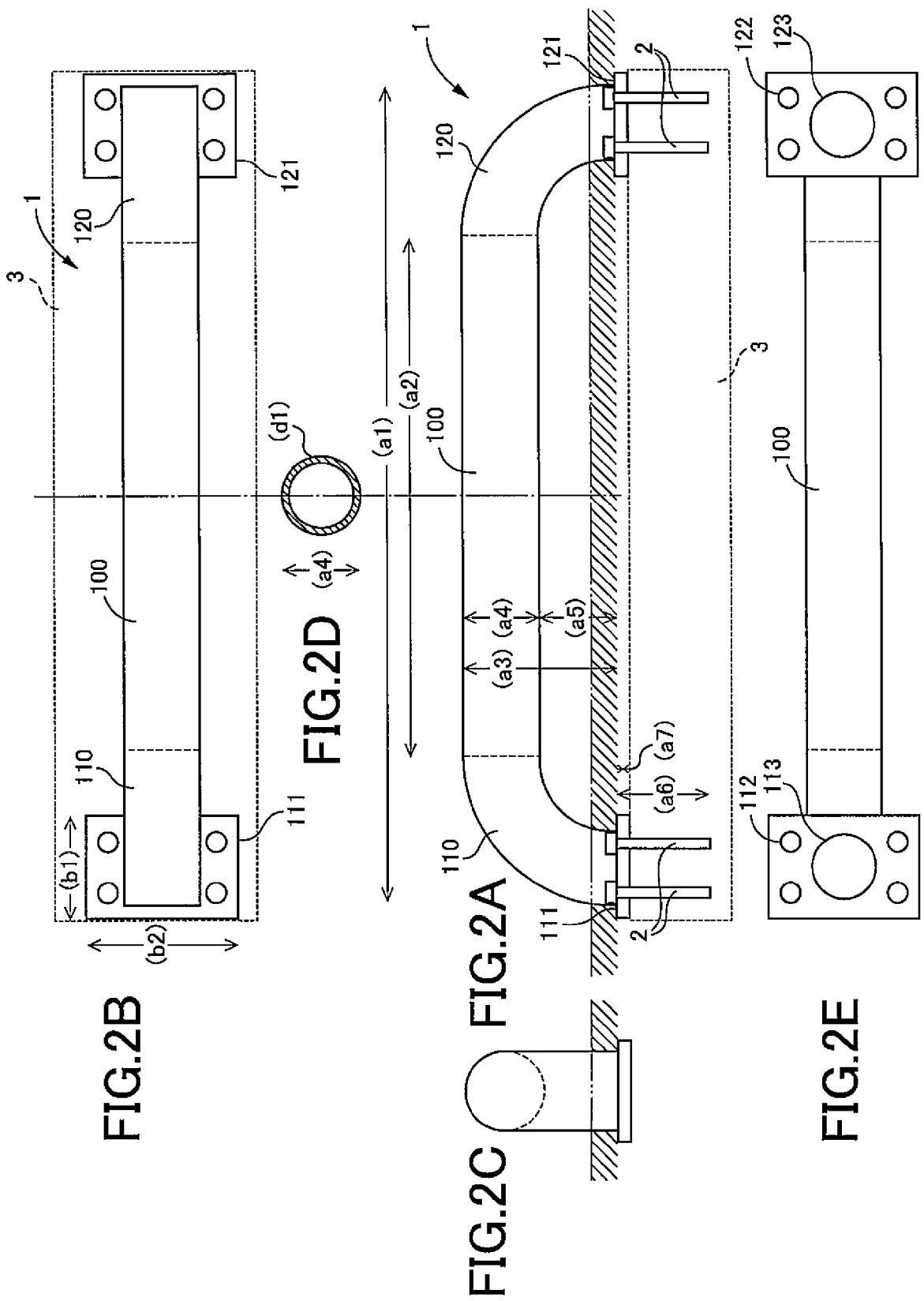

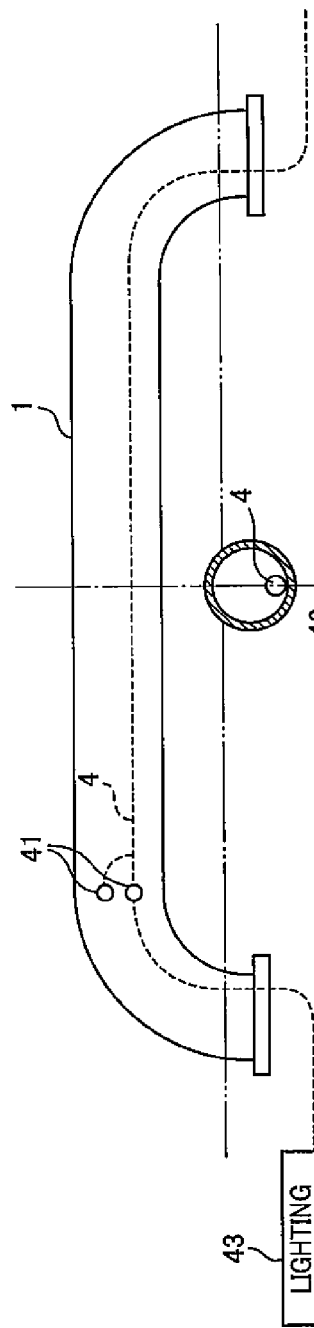
FIG.3B
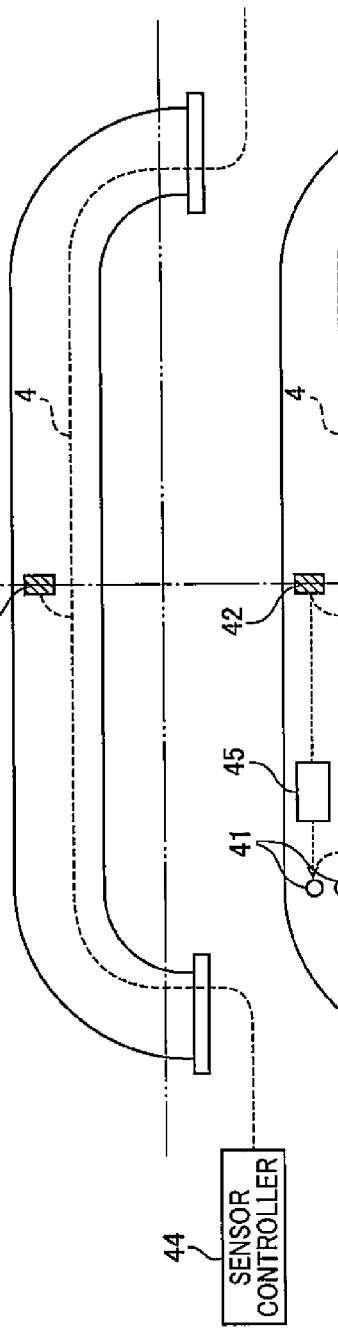
FIG.3C
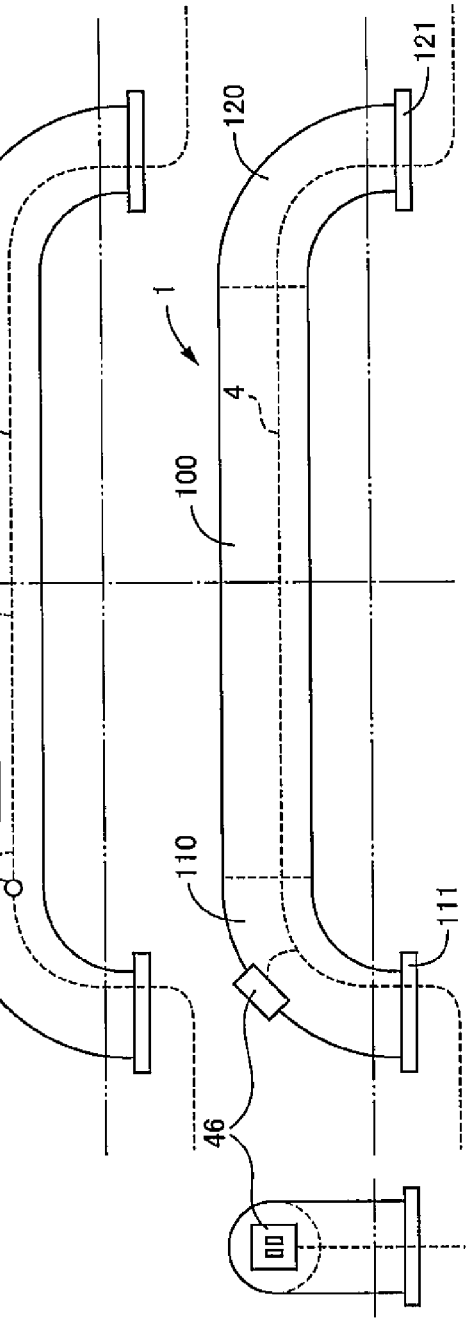
FIG.3D
FIG.3A

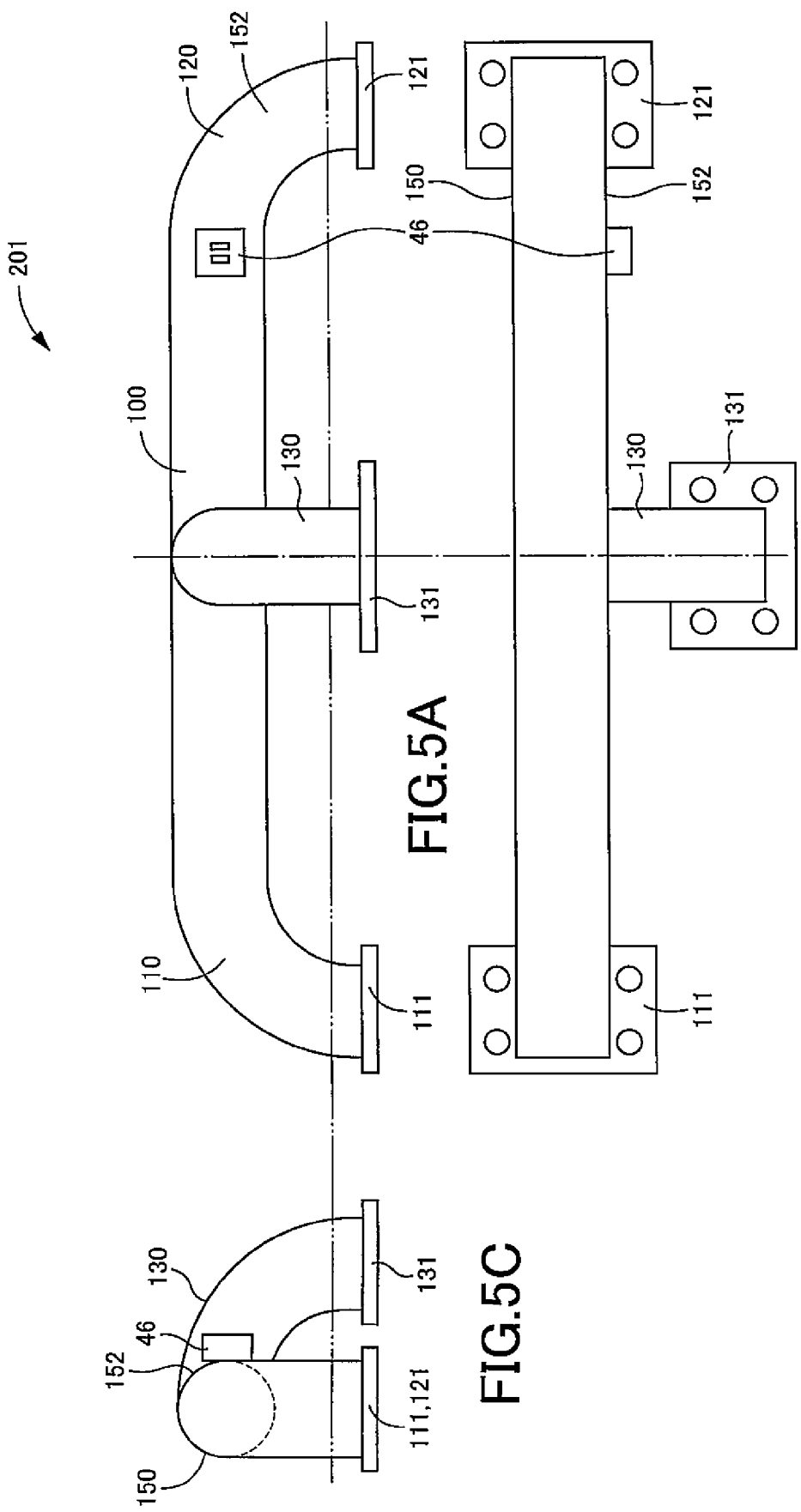

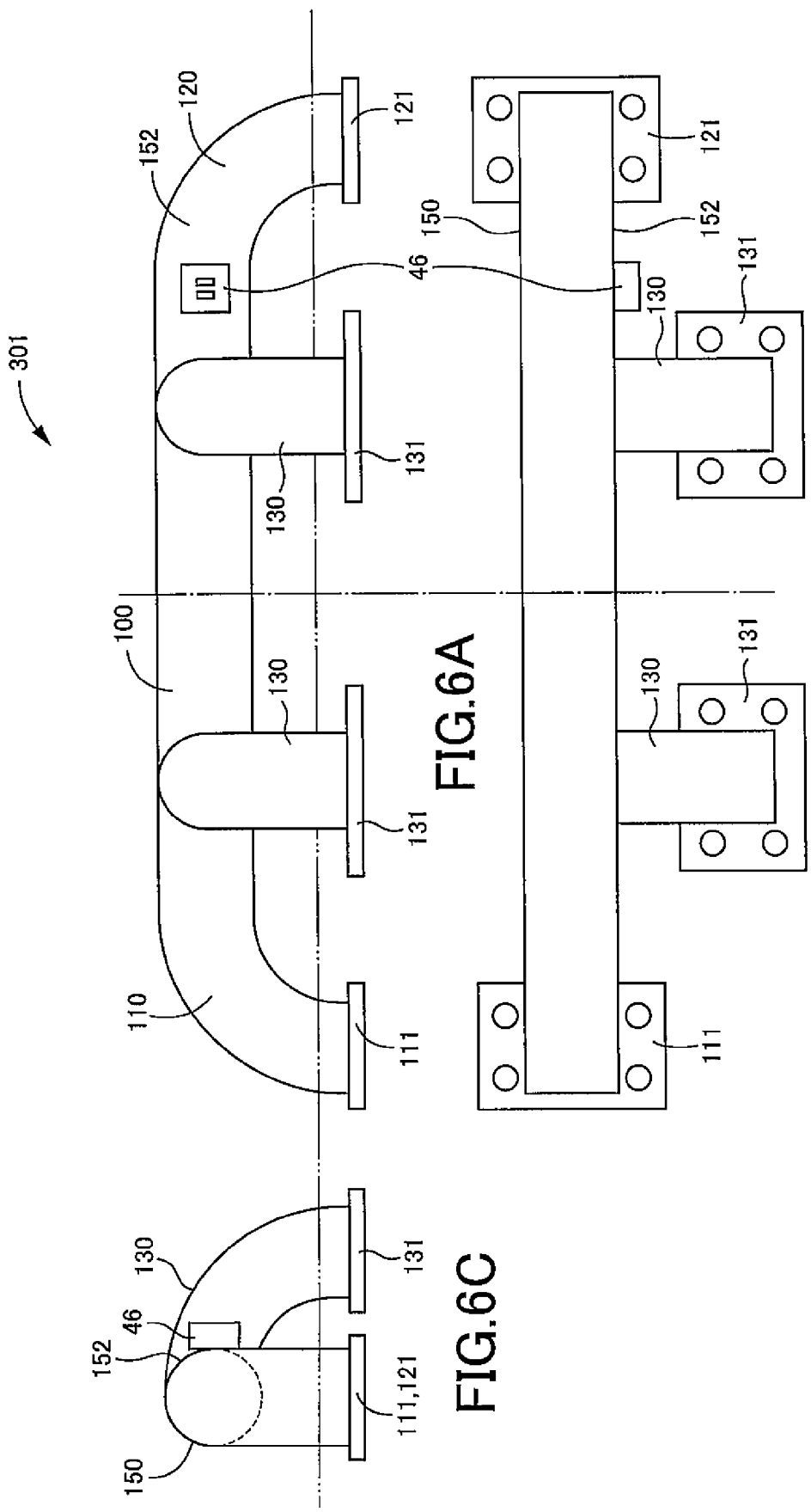

WHEEL STOP MADE OF METAL PIPE AND CAPABLE OF TRANSMITTING POWER TO ELECTRIC CAR WHILE BEING PARKED

CROSS-REFERENCE TO RELATED APPLICATIONS

This application is a continuation-in-part filing of International Patent Application No. PCT/JP2009/002017, filed May 8, 2009 and published Dec. 10, 2009 as WO 2009/147783, which claims the priority benefit of Japanese Serial No. 2008-146503, filed Jun. 4, 2008, the contents of which applications and publication are incorporated herein by reference in their entirety.

BACKGROUND

1. Technical Field

This technology relates generally to a wheel stop installed on a supporting surface of a vehicular parking lot, which is engaged by selected at least one of a plurality of wheels of a vehicle in an attempt to be parked in the parking lot, to limit movement of the vehicle in a direction that allows the selected at least one wheel to pass over the wheel stop, to thereby define a parking space for the vehicle.

2. Description of the Related Art

In some cases, a wheel stop is installed on a supporting surface (e.g., a ground surface, an asphalt surface, a concrete surface, a floor surface, or the like) of a vehicular parking lot (whether is indoor or outdoor) where a vehicle (e.g., an automobile, a bicycle, a motorcycle, or the like). The wheel stop is engaged by selected at least one of a plurality of wheels of a vehicle in an attempt to be parked in the parking lot, to limit movement (forward or rearward) of the vehicle in a direction that allows the selected at least one wheel to pass over the wheel stop, to thereby define a parking space for the vehicle (i.e., define a forward or rearward position of the vehicle in the parking lot).

Japanese Patent Application Publication No. 2003-074025 discloses a technique which allows two wheel stops (i.e., concrete abutments) for a pair of front or rear wheels (i.e., right and left wheels on the same side) of a vehicle to be parked, to be installed laterally in a linear array with a predetermined length of space left between the two wheel stops. An arrangement in which these wheel stops are spaced apart from each other prevents a puddle of rain water, etc. from occurring in proximity to these wheel stops.

Traditionally, a typical wheel stop is made of concrete and in the form of a prism. The typical wheel stop is adhered to an asphalt surface of a parking lot, using an adhesive or adhesive bonding. This concrete wheel stop (i.e., a concrete abutment) has a gray color like the asphalt surface.

The information included in this Background section of the specification, including any references cited herein and any description or discussion thereof, is included for technical reference purposes only and is not to be regarded subject matter by which the scope of the invention as defined in the claims is to be bound.

SUMMARY

In recent years, electric cars have been more and more widely used, and in the near future, it will probably be common to electrically charge a rechargeable battery mounted in an electric car while it is parked in a parking lot. However, for an electric car to be charged in a conventional parking lot, there is a need for installing an electric facility equipped with an electric outlet, on the parking lot, within an area which surrounds the electric car without interfering possible movement of the electric car. For charging the electric car in this conventional parking lot, a user is required to plug one end of an electric cable extending from the electric car, into the electric outlet of the electric facility which is remote from the electric car.

As a result, in this situation, generally, the user is required to extend the electric cable from the electric car, to a large length such as at least about two meters. Due to this, the electric cable is laid on the supporting surface of the parking lot, which results in a risk of people who walk through the parking lot, tripping or stumbling over the electric cable, and which results in a dependent risk of the people getting injured and the electric facility being damaged or broken.

In addition, for a driver, when driving a vehicle in a parking lot, in a rearward or reverse direction to approach a rearward position in a defined parking space, while looking at a wheel stop in a rear view mirror of the vehicle, it is more preferable that the wheel stop has a brighter color distinct from the color of the supporting surface of the parking lot, in order to help the driver in visually distinguishing the wheel stop from the supporting surface of the parking lot. In particular, when a driver drives a vehicle to park it in a parking lot at night, it is difficult to visually distinguish a wheel stop made of concrete and colored gray, from a supporting surface of the parking lot.

In the case of a wheel stop made of concrete, a countermeasure is proposed to blend raw material of the wheel stop with a coloring agent (e.g., a pigment), for allowing the driver to visually identify the wheel stop more easily. This countermeasure, however, makes it difficult to reduce the minimum manufacturing cost of the wheel stop. In many cases, wheel stops made of concrete, therefore, are designed to have reflective plates adhered to the wheel stops. Each reflective plate allows light emitted from tail lights of a vehicle, to reflect from the reflective plate, and the reflected light helps a driver of the vehicle in identifying the position of the wheel stop.

In addition, a concrete wheel stop has a heavy weight, with poor mobility. And a concrete wheel stop is adhered to a supporting surface of a parking lot using an adhesive (e.g., adhesive bonding), and degradation of the adhesive makes it difficult to permanently keep anchoring the wheel stop to the supporting surface of the parking lot, with our visual perception of some of such wheel stops being unintentionally detached from an asphalt supporting surface of a parking lot. We often see parking lots with wheel stops left detached from supporting surfaces of the parking lots.

In view of the foregoing, it would be desirable to provide a wheel stop capable of transmitting electric power to an electric car while it is being parked in a parking space defined by the wheel stop, without requiring installation of an electric power transmitting facility at one of locations around the electric car parked.

In one implementation, there is provided a wheel stop installed on a supporting surface of a vehicular parking lot, which is engaged by selected at least one of a plurality of wheels of a vehicle in an attempt to be parked in the parking lot, to limit movement of the vehicle in a direction that allows the selected at least one wheel to pass over the wheel stop, to thereby define a parking space for the vehicle. The wheel stop comprises a middle extending portion, first and second leg portions, all of which are integrally formed with a continuous and hollow metal pipe. The middle extending portion extends generally horizontally, to thereby allow the selected at least one wheel to abut with the wheel stop. The first and second leg portions are each in the form of an elbow bent at generally 90 degrees, each leg portion having a proximal end located at a corresponding one of both ends of the middle extending portion, and a distal end supported on the supporting surface of the parking lot. The wheel stop further comprises first and second anchor plates affixed to the distal ends of the first and second leg portions, respectively, the anchor plates being anchored to the supporting surface of the parking lot; an electric cable disposed within the metal pipe; and a power transmitter disposed on or within the metal pipe, for, when the vehicle parked in the parking lot is an electric car, transmitting electric power to an electric power source of the electric car by wire or wireless, the power transmitter being connected with the electric cable.

In another implementation, there is provided a method of installing a wheel stop on a supporting surface of a parking lot, wherein the wheel stop is engaged by selected at least one of a plurality of wheels of a vehicle in an attempt to be parked in the parking lot, to limit movement of the vehicle in a direction that allows the selected at least one wheel to pass over the wheel stop, to thereby define a parking space for the vehicle. The wheel stop comprises a middle extending portion, first and second leg portions, all of which are integrally formed with a continuous and hollow metal pipe, wherein the middle extending portion extends generally horizontally, to thereby allow the selected at least one wheel to abut with the wheel stop, and the first and second leg portions are each in the form of an elbow bent at generally 90 degrees, each leg portion having a proximal end located at a corresponding one of both ends of the middle extending portion, and a distal end supported on the supporting surface of the parking lot. The wheel stop further comprises first and second anchor plates affixed to the distal ends of the first and second leg portions, respectively, the anchor plates being anchored to the supporting surface of the parking lot; an electric cable disposed within the metal pipe; and a power transmitter disposed on or within the metal pipe, for, when the vehicle parked in the parking lot is an electric car, transmitting electric power to an electric power source of the electric car by wire or wireless, the power transmitter being connected with the electric cable. The method comprises the steps of burying the electric cable under the parking lot; and securing the first and second anchor plates to the supporting surface of the parking lot, such that vertical space is left between the middle extending portion and a top surface of the parking lot, which is equal to or above the supporting surface.

In a further implementation, there is provided a wheel stop installed on a supporting surface of a vehicular parking lot, which is engaged by selected at least one of a plurality of wheels of a vehicle in an attempt to be parked in the parking lot, to limit movement of the vehicle in a direction that allows the selected at least one wheel to pass over the wheel stop, to thereby define a parking space for the vehicle. The wheel stop comprises a middle extending portion, and first and second leg portions, all of which are integrally formed with a continuous and hollow metal pipe, wherein the middle extending portion extends generally horizontally, to thereby allow the selected at least one wheel to abut with the wheel stop, and the first and second leg portions are each in the form of an elbow bent at generally 90 degrees, each leg portion having a proximal end located at a corresponding one of both ends of the middle extending portion, and a distal end supported on the supporting surface of the parking lot. The wheel stop further comprises first and second anchor plates affixed to the distal ends of the first and second leg portions, respectively, the anchor plates being anchored to the supporting surface of the parking lot; an electric cable disposed within the metal pipe; and a power transmitter disposed on or within the metal pipe, for, when the vehicle parked in the parking lot is an electric car, wirelessly transmitting electric power to an electric power source of the electric car, the power transmitter being connected with the electric cable.

It is noted here that, as used in this specification, the singular form "a," "an," and "the" include plural reference unless the context clearly dictates otherwise. It is also noted that the terms "comprising," "including," and "having" can be used interchangeably.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention as defined in the claims is provided in the following written description of various embodiments of the invention and illustrated in the accompanying drawings.

BRIEF DESCRIPTION OF THE SEVERAL VIEWS OF THE DRAWINGS

The foregoing summary, as well as the following detailed description, will be better understood when read in conjunction with the appended drawings. For the purpose of illustration, there are shown in the drawings embodiments which are presently preferred. It should be understood, however, that the invention claimed below is not limited to the precise arrangements and instrumentalities shown. In the drawings:

FIG. 1A is a side view illustrating a pair of right- and left-hand wheel stops, which are constructed according to a first illustrative embodiment, and which are installed in a parking lot, together with a vehicle parked in the parking lot, and FIG. 1B is a perspective view illustrating the pair of right- and left-hand wheel stops which are installed in the parking lot;

FIG. 2A is a front view illustrating a representative one of the wheel stops depicted in FIG. 1, FIG. 2B is a plan view illustrating the wheel stop, FIG. 2C is a side view illustrating the wheel stop, FIG. 2D is a sectional view illustrating a metal pipe constituting the wheel stop, and FIG. 2E is a bottom view illustrating the wheel stop;

FIG. 3A is a combination of a front view and a side view illustrating the wheel stop depicted in FIG. 2, FIG. 3B is a combination of a front view illustrating a first modified version of the wheel stop depicted in FIG. 2, and a sectional view illustrating the metal pipe of the wheel stop, FIG. 3C is a front view illustrating a second modified version of the wheel stop depicted in FIG. 2, and FIG. 3D is a front view illustrating a third modified version of the wheel stop depicted in FIG. 2;

FIG. 5A is a back view illustrating a wheel stop constructed according to a second illustrative embodiment, FIG. 5B is a plan view illustrating the wheel stop, and FIG. 5C is a side view illustrating the wheel stop;

FIG. 6A is a back view illustrating a wheel stop constructed according to a third illustrative embodiment, FIG. 6B is a plan view illustrating the wheel stop, and FIG. 6C is a side view illustrating the wheel stop;

DETAILED DESCRIPTION

Figures 4A, 4B:
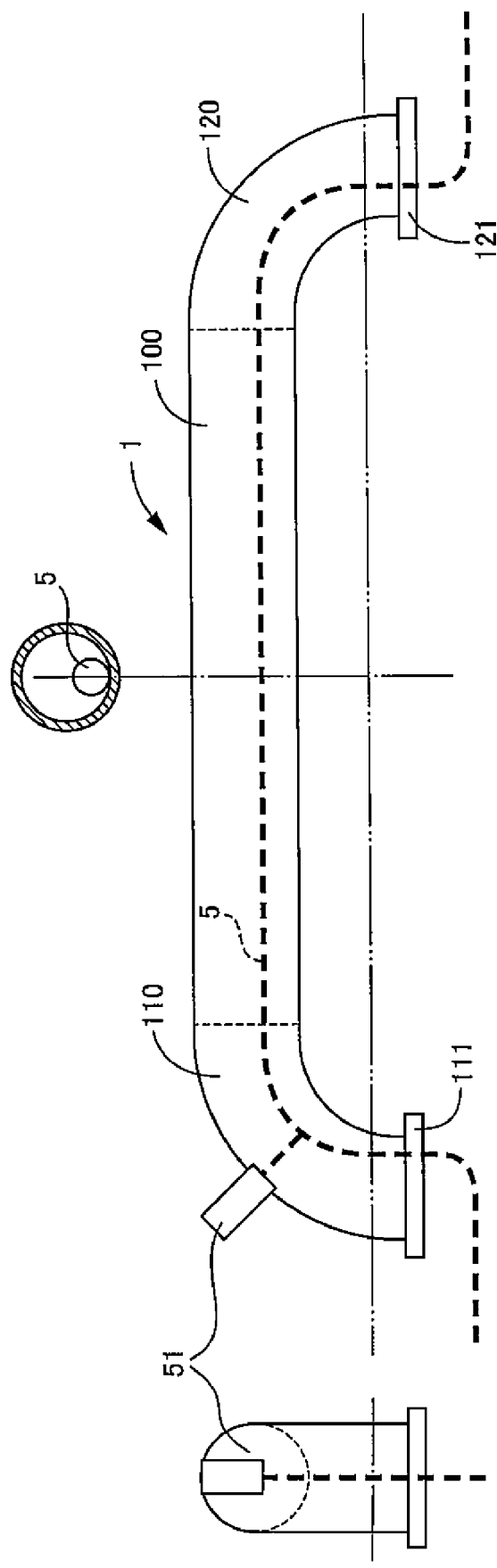
FIG. 4A is a front view illustrating a fourth modified version of the wheel stop depicted in FIG. 2.
FIG. 4B is a side view illustrating the fourth modified version.

The following modes are provided as illustrative embodiments.

According to a first implementation, there is provided the wheel stop, wherein the power supply cable is connected with a rechargeable power source of the electric car and the electric outlet, when the power supply cable is plugged into the electric outlet, transmits electric power to the power source through the power supply cable.

According to a second implementation, there is provided the wheel stop according to the first implementation, further comprising a third leg portion formed with another metal pipe, in the form of an elbow bent at generally 90 degrees, the third leg portion having a proximal end affixed to the middle extending portion on an opposite side to a side on which the selected at least one wheel abuts with the middle extending portion, and a distal end supported on the supporting surface of the parking lot; and a third anchor plate affixed to the distal end of the third leg portion, the third anchor plate being anchored to the supporting surface of the parking lot.

According to a third implementation, there is provided the wheel stop according to the first implementation further comprising an additional third leg portion, to thereby increase a maximum compression force which the wheel stop can withstand when the wheel stop restrains movement of the selected at least one wheel.

According to a fourth implementation, there is provided the wheel stop according to any one of the first through third implementations, wherein the outer surface of the metal pipe has a front side face with which the selected at least one wheel abuts, and a rear side face which is opposite to the front side face, and the electric outlet is disposed on the rear side face.

According to a fifth implementation, there is provided the wheel stop according to the fourth implementation, further comprising at least one LED (Light Emitting Diode) marker which is disposed on the front side face and which is visible to a driver of the vehicle when driving the vehicle in a direction to approach the wheel stop, and wherein the electric cable includes a power line which connects the at least one LED marker and a power source for supply of electric power to the at least one LED marker.

According to a sixth implementation, there is provided the wheel stop according to the fifth implementation, wherein the at least one LED marker is disposed on the front side face outside of a silhouette of the vehicle which is produced by projecting the vehicle onto the front side face in a front view.

According to a seventh implementation, there is provided the wheel stop according to any one of the fourth through sixth implementations, wherein the front side face extends axially along the middle extending portion, the wheel stop further comprises at least one protective plate made of metal, and affixed to a surface of the front side face, and the at least one protective plate contacts directly with the selected at least one wheel when the selected at least one wheel attempts to abut with the middle extending portion, to thereby prevent the surface of the front side face from being damaged due to direct contact of the selected at least one wheel with the surface of the front side face.

Several presently preferred illustrative embodiments will be described in more detail by reference to the drawings in which like numerals are used to indicate like elements throughout.

First Illustrative Embodiment

Referring now to FIGS. 1 to 4, a wheel stop 1 according to a first illustrative embodiment will be described.

FIG. 1A is a side view illustrating a pair of right- and left-hand wheel stops 1, 1 used to limit rearward movement (or forward movement) of a four-wheel motor vehicle 7 in an outdoor (or indoor) parking lot PL, by abutment with rear right and left wheels (or front right and left wheels) 6, 6 of the vehicle 7. The wheel stops 1, 1 are installed on a supporting surface of the parking lot PL. FIG. 1B is a perspective view illustrating the wheel stops 1, 1.

The wheel stops 1, 1 are disposed at a rearward position (or a forward position) of a parking space for the vehicle 7 in the parking lot PL, in association with corresponding respective wheels 6 of the vehicle 7, in order to define the rearward position of the vehicle 7 (i.e., the rearward limit of parking for the vehicle 7). The wheel stops 1, 1 are in a linear array extending in a lateral direction, with a predetermined length of spacing left between the wheel stops 1, 1, and with vertical spacing left between a bottom face of a portion of each wheel stop 1 with which the corresponding wheel 6 abuts, and a top or exposed surface of the parking lot PL (e.g., an asphalt surface, a concrete surface, a top surface of a top layer of small pebbles, etc., of the parking lot PL). The vertical spacing allows rain water, if any, to flow below or through each wheel stop 1, which prevents rain water, if any, from collecting in the vicinity of each wheel stop 1.

Each wheel stop 1 is made up of a hollow metal pipe or tube, which means conversion of a raw material of the wheel stop 1 from a conventional concrete material into a metal pipe. The material conversion allows each wheel stop 1 to be painted in any desired color with selected paint. The wheel stop 1, when colored in a brighter color than that of the surface of the parking lot PL, helps a driver of the vehicle 7 in an attempt to park the vehicle 7 by rearward movement while seeing the rear view through a rearview mirror of the vehicle 7, in distinguishing the wheel stop 1 from the surface of the parking lot PL.

FIG. 2A is a front view illustrating a representative one of the wheel stops 1, 1 depicted in FIG. 1, FIG. 2B is a plan view illustrating the wheel stop 1, FIG. 2C is a side view illustrating the wheel stop 1, FIG. 2D is a sectional view illustrating the metal pipe constituting the wheel stop 1, and FIG. 2E is a bottom view illustrating the wheel stop 1. In FIGS. 2A and 2C, the supporting surface of the parking lot PL is illustrated in broken lines, while the top surface of the parking lot PL is illustrated two-dotted lines.

The wheel stop 1 is designed to have a middle extending portion 100, first and second leg portions 110, 120, all of which are integrally formed with a continuous and hollow metal pipe. The middle extending portion 100 extends generally horizontally a predetermined length, to thereby allow the wheel 6 to abut with the wheel stop 1. The first and second leg portions 110, 120 are each in the form of an elbow bent at generally 90 degrees. Each leg portion 110, 120 has a proximal end located at a corresponding one of both ends of the middle extending portion 100, and a distal end supported on the supporting surface of the parking lot PL. Each leg portion 110, 120 has two straight segments, one of which extends in the same direction of the middle extending portion 100, the other of which is bent about 90 degrees from the former straight segment. The middle extending portion 100, the first and second leg portions 110, 120 are manufactured from one straight metal pipe, using a pipe bending machine capable of bending a metal pipe or pipe by a desired one of angles ranging from 0 to 180 degrees.

Each wheel stop 1 is installed in the parking lot PL by anchoring the distal ends of the first and second leg portions 110, 120 to the supporting surface of the parking lot PL, so as to leave vertical spacing between the top surface of the parking lot PL and the bottom face of the middle extending portion 100. The vertical spacing between the middle extending portion 100 and the top surface of the parking lot PL prevents rain water, dust or any other things from collecting, and also allows a vehicle (e.g., an automobile, a motorcycle, a bicycle, or the like) to be chained to the wheel stop 1 with a lockable chain (e.g., an endless chain), which prevents vehicle theft.

The distal ends of the first and second leg portions 110, 120 are secured, by welding, for example, to first and second metal anchor plates 111, 121, respectively. The anchor plates 111, 121 create outwardly extending flanges (larger than the diameter of the leg portions 110, 120) surrounding respective open ends of the leg portions 110, 120. The wheel stop 1 is installed, by bolting the first and second anchor plates 111, 121 to the top face of a concrete base 3 buried under the ground of the parking lot PL, using bolts 2 or fasteners inserted through engagement holes 112 formed through the outwardly extending flanges of the anchor plates 111, 121. In this embodiment, the concrete base 3 and the anchor plates 111, 121 are overlaid or covered with a top layer of pebbles, with the top face of the concrete base 3 constituting the supporting surface of the parking lot PL, with the top surface of the top layer of pebbles constituting the top surface (i.e., an exposed surface) of the parking lot PL. In other words, the concrete base 3 and the anchor plates 111, 121 are buried under the ground of the parking lot PL.

Traditionally, for a parking lot which is covered with a top layer of pebbles, it was difficult to securely fix a conventional concrete wheel stop to the top surface of such a parking lot, and the concrete wheel stop was merely put on the top surface of such a parking lot.

In contrast, in this embodiment, because the wheel stop 1 is made of a metal pipe which is less brittle and fragile than concrete, and the wheel stop 1 can be securely bonded to metal plates such as the anchoring plates 111, 121, the anchor plates 111, 121 are securely bonded to the metal pipe of the wheel stop 1, and the anchor plates 111, 121 are securely bolted to the concrete base 3. This embodiment allows the wheel stop 1 to be securely fixed to the supporting surface of the parking lot PL even if it is covered with a top layer of pebbles.

The metal pipe constituting the wheel stop 1 preferably has a cross section with a curved outline, which may be a circle. Although it is of course that the wheel stop 1 may be a prism, the wheel stop 1 preferably has a curved outline for reducing impact on the wheel 6 occurring in response to abutment with the wheel stop 1.

The first and second anchor plates 111, 121 have respective through holes 113, 123 which keep the respective open ends of the metal pipe open, even after affixation of the anchor plates 111, 121 to both open ends of the metal pipe. As described before, the first and second anchor plates 111, 121 have the engagement holes 112, 122 allowing the bolts 2 to pass through the anchor plates 111, 121.

In a preferable and exemplified arrangement, the wheel stop 1 takes, but not limited to, the following dimensions:

a1 (length of the metal pipe in plan view): 760 mm;
a2 (length of the middle extending portion 100): 500 mm;
a3 (vertical distance between the top face of the concrete base 3 and the top face of the middle extending portion 100): 133 mm;
a4 (diameter of the middle extending portion 100): 76 mm;
a5 (vertical distance between the top face of the concrete base 3 and the bottom face of the middle extending portion 100): 57 mm;
a6 (length of a portion of each bolt 2 below each anchor plate 111, 121): 80 mm;
a7 (thickness of each anchor plate 111, 121): 6 mm;
b1 (longitudinal length of each anchor plate 111, 121): 100 mm;
b2 (lateral length or width of each anchor plate 111, 121): 150 mm; and
d1 (thickness of the wall of the metal pipe): 4 mm.

FIG. 3A is a combination of a front view and a side view illustrating the wheel stop 1 depicted in FIG. 2. FIG. 3B is a combination of a front view illustrating a first modified version of the wheel stop 1 depicted in FIG. 2, and a sectional view illustrating the metal pipe of the wheel stop 1. FIG. 3C is a front view illustrating a second modified version of the wheel stop 1 depicted in FIG. 2. FIG. 3D is a front view illustrating a third modified version of the wheel stop 1 depicted in FIG. 2.

As illustrated in FIG. 3A, a portion of an electric cable 4 is passed through the metal pipe of the wheel stop 1. In an exemplary implementation, a portion of the electric cable 4 is buried under the ground of the parking lot PL (e.g., an asphalt layer, a concrete layer, or a soil layer), and then a different portion of the electric cable 4 is passed through the metal pipe and the through holes 113, 123. The electric cable 4 has ends, at least one of which is invisible in FIG. 3A, and which is electrically connected with a commercial power source (or public utility service lines) 540 (see FIG. 7A) or an alternative power source (not shown) which generates electric power, via a power box 530 (see FIG. 7A). The power box 530 may be configured to have a regulator to stabilize the level of the actual power output.

In this embodiment, as illustrated in FIG. 3A, with the electric cable 4, there is electrically connected an electric outlet or electrical power outlet 46 (i.e., an exemplary electric device). The electric outlet 46 can output electric power supplied from the power box 530. The electric outlet 46 is disposed on, but not limited to, one of the leg portions 110, 120 (or one of longitudinal ends of the wheel stop 1).

In some cases, the vehicle 7 parked in the parking lot PL is an electric car which has, as illustrated in FIG. 1A, a rechargeable power source, i.e., a battery 400, a power supply cable 402 extending from the battery 400 with its exposed section from the electric car 7, and a connector 404 electrically connected with one end of the exposed section of the power supply cable 402.

When the vehicle 7 is such an electric car, the user or driver of the electric car 7 can plug the connector 404 into the electric outlet 46, while being parked, for charging the battery 400, without requiring installation of an electric facility for charging the battery 400, in the parking lot PL, at a selected one of locations around the electric car 7.

In a first modified version of the wheel stop 1, as illustrated in FIG. 3B, with the electric cable 4, there is electrically connected light emitting devices (e.g., LEDs (Light Emitting Diodes)) 41 which are, in turn, electrically connected with a lighting controller 43. The light emitting devices 41 are powered by the electric cable 4, and are controlled by the lighting controller 43. The light emitting devices 41 are disposed away from the vertical centerline of the wheel stop 1, or away from a silhouette of the wheel 6 when viewed rearward (see FIG. 7A).

In an exemplary implementation, the lighting controller 43 is configured to detect intensity of the ambient light, and, based on the result, to turn on the light emitting devices 41 for illumination of the wheel stop 1 only at night or day during periods of low intensity ambient light. Partial illumination of the wheel stop 1 helps the user of the vehicle 7 in visually identifying the position of the wheel stop 1, in order to drive the vehicle 7 up to a defined parking space at night, for example.

In a second modified version of the wheel stop 1, as illustrated in FIG. 3C, with the electric cable 4, there is electrically connected a sensor 42 (i.e., another exemplary electric device). The sensor 42 is electrically connected with a sensor controller 44. The sensor 42 is configured, such that, if it detects the presence of the vehicle 7 to be parked, then it emits a signal indicating that an incoming vehicle is present, and transmits, by wire, the signal to the sensor controller 44. In response, the sensor controller 44 operates to achieve a desired function, as described below, for example.

In a third modified version of the wheel stop 1, as illustrated in FIG. 3D, with the electric cable 4, there are electrically connected both the light emitting devices 41 and the sensor 42. The light emitting devices 41 and the sensor 42 are electrically connected with a lighting controller 45 which is disposed within the metal pipe. The lighting controller 45 operates such that, if the sensor 42 detects an incoming vehicle, then the light emitting devices 41 are turned on for illumination of the wheel stop 1. This arrangement does not require the light emitting devices 41 to emit light when an incoming vehicle is absent, resulting in a reduction in power consumption.

As will be evident from the foregoing, installation of the electric cable 4 through the metal pipe of the wheel stop 1 allows at least one different kind of an electric device, to be, alternatively or additionally, installed on the wheel stop 1.

FIG. 4A is a front view illustrating a fourth modified version of the wheel stop 1, and FIG. 4B is a side view illustrating the fourth modified version.

In the fourth modified version, as illustrated in FIGS. 4A and 4B, a tap water hose 5 runs through the metal pipe of the wheel stop 1. Additionally or alternatively, a faucet 51 for tap water is attached to, but not limited to, one of the leg portions 110, 120 (or one of longitudinal ends of the wheel stop 1). More specifically, the faucet 51 is disposed away from the centerline of the wheel stop 1, or away from a silhouette of the wheel 6 when viewed rearward (see FIG. 7). The faucet 51 is connected with the tap water hose 5.

Because the faucet 51 is in the proximity of the vehicle 7, the user can use tap water for the vehicle 7, for a particular purpose (e.g., for the purpose of washing the vehicle 7), using a minimized length of a water hose, with reduced labor. Owing to the faucet 51 being located there, there is no need for installing a faucet at a selected one of locations around the vehicle 7, and no need for using an elongated water hose.

As will be evident from the foregoing, the wheel stop 1 is in the form of a metal pipe within which the electric cable 4 is disposed, and is equipped with the electric outlet 46 connected with the electric cable 4. As a result, the user, after plugging the power supply cable 402 extending from the electric car 7, into the electric outlet 46 of the wheel stop 1, operates the wheel stop 1 to transmit electric power to the electric car 7, while the electric car 7 is being parked, using the power supply cable 402 with a minimum length, without requiring installation of an electric power transmitting facility at one of locations around the electric car 7 parked.

Additionally, the wheel stop 1 allows an electric line between the wheel stop 1 and the electric car 7, to be minimized, preventing a lengthy electric line from being laid on the top surface of the parking lot PL, with a reduced risk of people who walk through the parking lot PL, tripping or stumbling over the electric line, and with a reduced dependent risk of the people getting injured and the electric facility being damaged or broken.

Still additionally, the wheel stop 1 is made of a metal pipe, and therefore, it is easier to apply colors to the wheel stop 1, transport or carry the wheel stop 1, and securely fix the wheel stop 1 to the parking lot PL, than when the wheel stop 1 is hypothetically made of other materials, for example, concrete.

Yet additionally, the wheel stop 1 can act as a passage or a channel through which an additional line runs for other facilities to be installed in the parking lot PL.

Second Illustrative Embodiment

Referring next to FIG. 5, a second illustrative embodiment will be described.

In view of the fact that the present embodiment is common in construction to the first embodiment with respect to many elements, only the different elements in the present embodiment from those of the first embodiment will be described below in more detail, for better understanding the present embodiment, while the common elements of the present embodiment to those of the first embodiment will be referenced the same reference numerals or names as those in the description and illustration of the first embodiment, without redundant description and illustration.

FIG. 5A is a back view illustrating a wheel stop 201 constructed according to the second illustrative embodiment, FIG. 5B is a plan view illustrating the wheel stop 201, and FIG. 5C is a side view illustrating the wheel stop 201.

The wheel stop 201 includes a third leg portion 130, in addition to the middle extending portion 100, the first and second leg portions 110, 120. The third leg portion 130 is formed with another metal pipe (i.e., a separate metal pipe (hereinafter referred to as "second metal pipe"), from the metal pipe (hereinafter referred to as "first metal pipe") integrally forming the middle extending portion 100, the first and second leg portions 110, 120). The third leg portion 130 is in the form of an elbow bent at generally 90 degrees. The third leg portion 130 has a proximal end, which is affixed to the middle extending portion 100, by welding, for example, on an opposite side to a side on which the wheel 6 abuts with the middle extending portion 100, and a distal end supported on the supporting surface of the parking lot PL.

The wheel stop 201 further includes a third anchor plate 131 which is affixed to the distal end of the third leg portion 130, by welding, for example. The third anchor plate 131 is anchored to the supporting surface (e.g., the top face of the concrete base 3) of the parking lot PL, by the bolts 2 or fasteners, for example.

More specifically, the third leg portion 130 is connected with the middle extending portion 100 substantially perpendicularly (i.e., so as to form an angle of about 90 degrees therebetween). The third leg portion 130 bends about 90 degrees, as with the first and second leg portions 110, 120. The distal end of the third leg portion 130 is securely fixed to the supporting surface of the parking lot PL.

The third leg portion 130 increases a maximum compression force which the wheel stop 201 can withstand when the wheel stop 201 restrains movement of the wheel 6, relative to when there is no third leg portion 130. In other words, the third leg portion 130 is located behind the first metal pipe, for reinforcement of the first metal pipe.

The outer surface of the first metal pipe has a front side face 150 with which the wheel 6 abuts, and a rear side face 152 which is opposite to the front side face 150. The electric outlet 46 is disposed on, but not limited to, the rear side face 152. When the wheel 6 abuts with the wheel stop 201, the electric outlet 46 is not brought into contact with the wheel 6. This arrangement allows easier access to the electric outlet 46, even when the electric car 7 is being parked, than when the electric outlet 46 is hypothetically disposed on the front side face 150. The electric outlet 46 has a lid 514 (see FIG. 7B) switchable between a closed position and an open position, resulting in a water-proof function.

Third Illustrative Embodiment

Referring next to FIG. 6, a third illustrative embodiment will be described.

In view of the fact that the present embodiment is common in construction to the first and second embodiments with respect to many elements, only the different elements in the present embodiment from those of the first and second embodiments will be described below in more detail, for better understanding the present embodiment, while the common elements of the present embodiment to those of the first and second embodiments will be referenced the same reference numerals or names as those in the description and illustration of the first and second embodiments, without redundant description and illustration.

FIG. 6A is a back view illustrating a wheel stop 301 constructed according to the third illustrative embodiment, FIG. 6B is a plan view illustrating the wheel stop 301, and FIG. 6C is a side view illustrating the wheel stop 301.

The wheel stop 301 has a plurality of third leg portions 130 which are bonded to the middle extending portion 100 substantially perpendicularly, in a symmetric arrangement with respect to a vertical centerline of the wheel stop 301.

The third leg portions 130 increase a maximum compression force which the wheel stop 301 can withstand when the wheel stop 301 restrains movement of the wheel 6, relative to when there is no third leg portion 130, and when there is only one third leg portion 130. In other words, the third leg portions 130 are located behind the first metal pipe, for reinforcement of the first metal pipe, with the total number of the third leg portions 130 determined depending on the magnitude of the maximum compression force.

Fourth Illustrative Embodiment

Referring next to FIG. 7, a fourth illustrative embodiment will be described.

In view of the fact that the present embodiment is common in construction to the first and second embodiments with respect to many elements, only the different elements in the present embodiment from those of the first and second embodiments will be described below in more detail, for better understanding the present embodiment, while the common elements of the present embodiment to those of the first and second embodiments will be referenced the same reference numerals or names as those in the description and illustration of the first and second embodiments, without redundant description and illustration.

Figure 7A:
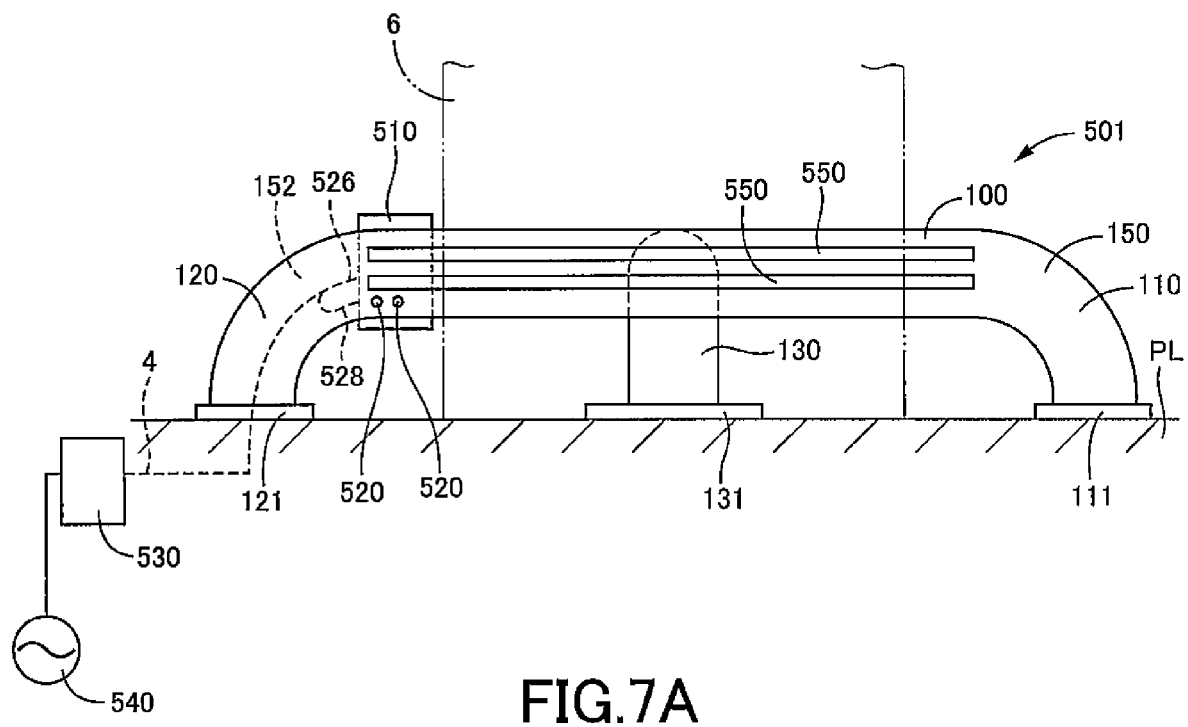
FIG. 7A is a front view illustrating a wheel stop constructed according to a fourth illustrative embodiment.
Figure 7B:
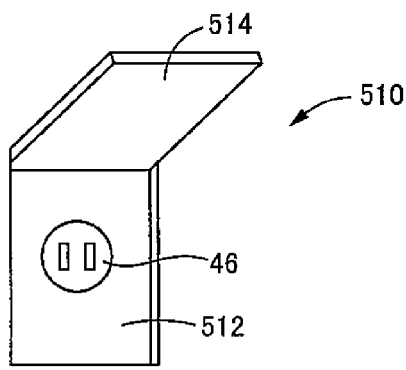
FIG. 7B is a perspective view illustrating an outlet box depicted in FIG. 7A.

FIG. 7A is a front view illustrating a wheel stop 501 constructed according to the fourth illustrative embodiment, and FIG. 7B is a perspective view illustrating an outlet box 510 depicted in FIG. 7A.

The representatively illustrated wheel stop 501 is used for a rear right wheel 6 in the case of rearward parking (or a front left wheel 6 in the alternative case of forward parking), another wheel stop 501 (not shown) which is symmetric to the illustrated wheel stop 501 is used for a rear left wheel 6 in the case of rearward parking (or a front right wheel 6 in the alternative case of forward parking).

As illustrated in FIG. 7A, the wheel stop 501 includes an outlet box 510 located on the rear side face 152. The outlet box 510 is configured, as illustrated in FIG. 7B, to include a body 512 having the electric outlet 46, and a lid 514 pivotably coupled with the body 512. While the wheel stop 501 is used, the lid 514 is in a closed position to close an opening of the body 512, to prevent water from intruding into the electric outlet 46. In other words, the electric outlet 46 is of a water-proof type.

The wheel stop 501 further includes a plurality of LED markers (only one LED marker) 520 which are disposed on the front side face 150, outside of a silhouette (illustrated in FIG. 7A in two-dotted lines) of the vehicle 7 which is produced by projecting the vehicle 7 onto the front side face 150 in a front view. Further, the LED markers 520 are deviated from the silhouette in a direction away from the vertical centerline of the vehicle 7.

The LED markers 520 can be seen by the driver of the vehicle 7, while the vehicle 7 is being driven in a rearward (or forward) direction to approach the wheel stop 501, without being occluded by the wheel 6 or the body of the vehicle 7.

The electric cable 4 includes an electric power line (larger current) 526 connected with the electric outlet 46, and an electric power line (smaller current) 528 connected with the LED markers 520. A portion of the electric cable 4 which is buried underground has an end which is connected with the power box 530 (whether buried or not), and the power box 530 is connected with the commercial power source 540.

The LED markers 520 are turned on at night for emission of light. This helps the driver of the vehicle 7 in driving the vehicle 7 in a reverse direction to approach the defined parking space in the outdoor parking lot PL at night, with the driver guided by light emitting from the LED markers 520.

The front side face 150 extends horizontally along the middle extending portion 100. The wheel stop 501 further includes protective plates (or only one protective plate) 550 made of metal, which are affixed to a surface of the front side face 150. Each protective plate 550 contacts directly with the wheel 6 when the wheel 6 attempts to abut with the middle extending portion 100, to thereby prevent the surface of the front side face 150 from being damaged due to direct contact of the wheel 6 with the surface of the front side face 150 (e.g., a painted surface).

Fifth Illustrative Embodiment

Referring next to FIG. 8, a fifth illustrative embodiment will be described.

In view of the fact that the present embodiment is common in construction to the first embodiment with respect to many elements, only the different elements in the present embodiment from those of the first embodiment will be described below in more detail, for better understanding the present embodiment, while the common elements of the present embodiment to those of the first embodiment will be referenced the same reference numerals or names as those in the description and illustration of the first embodiment, without redundant description and illustration.

Figure 8A:
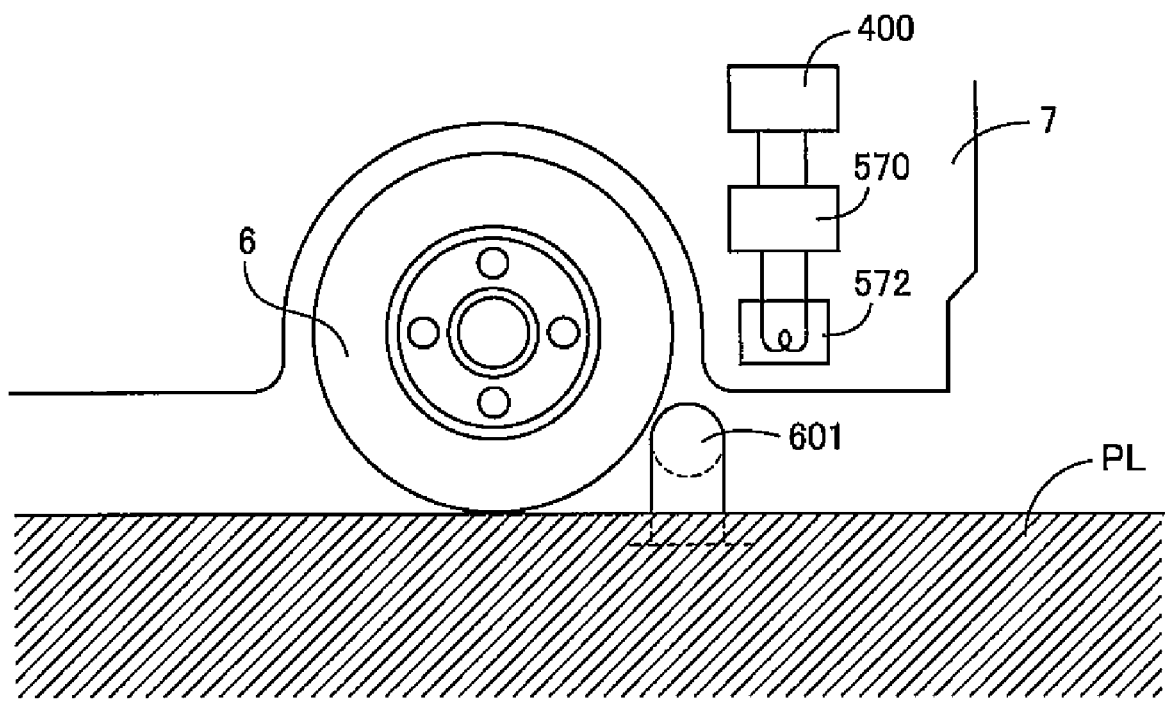
FIG. 8A is a side view illustrating a wheel stop constructed according to a fifth illustrative embodiment, which is installed in a parking lot, together with a vehicle parked in the parking lot.
Figure 8B:
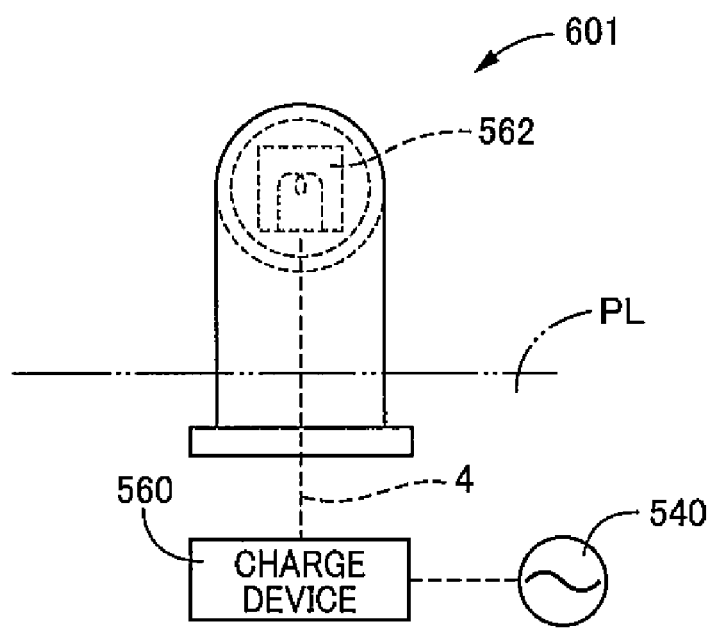
FIG. 8B is a side view illustrating the wheel stop depicted in FIG. 8A in enlargement.

FIG. 8A is a side view illustrating a wheel stop 601 constructed according to the fifth illustrative embodiment, and FIG. 8B is a side view illustrating the wheel stop 601 depicted in FIG. 8A in enlargement.

The wheel stop 601 has the function of charging the battery 400 of the electric car 7, contactlessly or wirelessly. To this end, the wheel stop 601 is configured to include a charge device 560 connected with the commercial power source 540, and a charge coupler 562 connected with the charge device 560 via the electric cable 4. The charge coupler 562 is disposed within the metal pipe of the wheel stop 601.

In construction, the charge device 560 includes a noise filter, a rectification/power-factor-improvement circuit, a resonance converter, etc. In operation, the charge device 560 converts an AC (alternative current) current which is supplied from the commercial power source 540 through the noise filter, into a DC (direct current) current, and then converts the DC current into a high frequency AC current, while distortion correction is being performed. The charge device 560 then supplies the high frequency AC current to the charge coupler 562.

On the other hand, the electric vehicle 7 has a rectification/smoothing circuit 570 connected with the battery 400, and a charge coupler 572 connected with rectification/smoothing circuit 570. While the electric car 7 is being parked, the charge coupler 572 on the side of the electric car 7 faces the charge coupler 562 on the side of the wheel stop 601. In this state, the battery 400 is charged by the wheel stop 601 by contactless or wireless magnetic induction.

Reference throughout the specification to "one embodiment" or "an embodiment" means that a particular feature, structure, or characteristic described in connection with the embodiment is included in at least one exemplary embodiment. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments. Moreover, inventive aspects lie in less than all features of a single disclosed embodiment. Thus, the claims following the Detailed Description are hereby expressly incorporated into this Detailed Description, with each claim standing on its own as a separate exemplary embodiment.

It is intended that all matter contained in the above description and shown in the accompanying drawings shall be interpreted as illustrative only of particular embodiments and not limiting. It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A wheel stop installed on a supporting surface of a vehicular parking lot, which is engaged by selected at least one of a plurality of wheels of a vehicle in an attempt to be parked in the parking lot, to limit movement of the vehicle in a direction that allows the selected at least one wheel to pass over the wheel stop, to thereby define a parking space for the vehicle, the wheel stop comprising a middle extending portion, first and second leg portions, all of which are integrally formed with a continuous and hollow metal pipe, wherein the middle extending portion extends generally horizontally, to thereby allow the selected at least one wheel to abut with the wheel stop, and the first and second leg portions are each in the form of an elbow bent at generally 90 degrees, each leg portion having a proximal end located at a corresponding one of both ends of the middle extending portion, and a distal end supported on the supporting surface of the parking lot, the wheel stop further comprising first and second anchor plates affixed to the distal ends of the first and second leg portions, respectively, the anchor plates being anchored to the supporting surface of the parking lot;

an electric cable disposed within the metal pipe; and an electric outlet disposed on an outer surface of the metal pipe, and connected with the electric cable, to thereby allow, when the vehicle parked in the parking lot is an electric car, a power supply cable extending from the electric car to be plugged into the electric outlet.

* * * * *